UNITED STATES PATENT OFFICE.

MARK SHOELD, OF CHICAGO, ILLINOIS, ASSIGNOR TO ARMOUR FERTILIZER WORKS, OF CHICAGO, ILLINOIS, A CORPORATION OF NEW JERSEY.

PHOSPHATE-ROCK-CALCINING PROCESS.

1,393,839.     Specification of Letters Patent.     Patented Oct. 18, 1921.

No Drawing.     Application filed February 24, 1920. Serial No. 360,958.

*To all whom it may concern:*

Be it known that I, MARK SHOELD, a subject of the King of Sweden, residing at Chicago, in the county of Cook and State of Illinois, have invented certain new and useful Improvements in Phosphate-Rock-Calcining Processes, of which the following is a specification.

It is well-known that the phosphate of natural ground phosphate rock may be rendered available, that is, converted into ammonium citrate-soluble form, by heat treatment in conjunction with sodium acid sulfate, sodium sulfate, or other sodium salts of an oxy-acid although the precise chemical reaction which occurs may not be fully understood. I have discovered that if the material or mixture to be treated is heated gradually to the required reaction temperature, there is seemingly a preliminary undesired or objectionable lumping up or sintering of the material before the necessary reaction temperature is reached without the desired conversion, which naturally lowers the percentage of the substance changed into available form at the higher temperature. Stated somewhat differently, if the material is gradually or slowly heated two sinterings seem to occur, one before the temperature of the reaction is reached, which is highly objectionable, and one brought about during the conversion reaction.

The leading object, therefore, of the present invention, is to provide a process or calcination method which will result in the production of a maximum percentage of the phosphate in available or readily usable form, and to this end it is important that the first or lower temperature sintering shall be overcome or avoided as much as possible. I have discovered or ascertained that this can be satisfactorily accomplished by heating the material undergoing treatment quite suddenly to the required or reaction temperature, or, stated otherwise, the process is performed in such a way that there is a rapid passage past or through such lower critical temperature. This can be done by quickly heating the mixture of natural phosphate rock and sodium acid sulfate or other suitable salt to the needed temperature, the rapidity of heating preventing in large measure the coalescing or sintering at the lower critical temperature referred to. It is preferable, however, to make a slurry of such mixture and under pressure project a comparatively-smooth unbroken stream thereof into the reaction zone of an internally-heated rotary kiln, but the type of furnace or kiln employed and the manner of heating it is in large measure immaterial. The presence of the water in the stream seemingly assists in enabling the mixture to pass through the lower fluxing or sintering temperature without substantial detrimental effects taking place, and the moisture or steam is apparently beneficial to the conversion reaction at the higher temperature. It is possible that the water is practically instantaneously changed into steam which action by holding the particles of the mixture desirably more or less separated prevents the undesired initial or preliminary sintering. The exact occurrences or changes which take place are at present not fully known to me, but the primary features of this invention are the sudden and practically instantaneous heating of the material to the required degree of temperature and the use of water in the manner indicated whose presence apparently assists in the performance of the reaction.

Referring now to the new and improved process in detail, the natural phosphate rock is ground wet with sodium acid sulfate (in the proportions of approximately 100 parts by weight of the former to 20 to 30 parts of the latter, the amounts of ingredients being more or less variable) in a ball mill, preferably connected in series with a classifier, and the overflow from the latter passes into a slurry tank, the contents of which are stirred or agitated by a paddle, to prevent settling. The material from such slurry tank, of a consistency of about 45 to 55 degrees Baumé, is carries by a rotary pump or steam injector into a pressure-tank, where it is subjected to a suitable air-pressure. From such tank, by means of an appropriate nozzle, and by reason of the internal air-pressure, the slurry is forced through the nozzle in the form of a smooth, substantially-unbroken stream, through the lower end of a rotary, inclined, internally-fired kiln directly into its central heat or reaction zone which is maintained at a temperature of about 1100 degrees to 1400 degrees centigrade. This sudden and almost instantaneous introduction of the slurry into the heat zone prevents in large measure, if not entirely, the objectionable results which would occur were the material more gradually raised to the reaction temperature, the latter being reached for each succesive part of the stream in from approximately one to five seconds. The position of this stream is desirably changed or shifted so as to play it throughout the entire length of the reaction zone by modifying the position or direction of play of the nozzle. A solid stream of liquid is desirably employed, otherwise a mere spray would render it difficult to have the stream play exactly in the places desired, and portions of such spray would doubtless reach some parts of the kiln or furnace where they would not be sufficiently adequately and rapidly heated to produce the results desired. The presence of the water in the slurry seemingly prevents the objectionable initial sintering by possibly being rapidly converted into steam and the presence of the latter at the higher temperature assists in the chemical reaction.

The heated gases leave the upper end of the rotary inclined kiln and pass through a settling chamber for the removal of the greater portion of the sodium salts, and from such compartment the gases pass through a regenerator system, reversing valve, and exhauster to the stack, the regenerators being employed in the customary manner to heat the air which flows through the kiln, thus conserving the heat.

By modifying the direction of play of the slurry stream, as by tilting or shifting the position of the nozzle, an undue cooling of any particular portion of the furnace is avoided.

The process or method herein set forth may be varied within comparatively wide limits without departure from the essential features of the invention, and it is to be understood that various modifications may be made in this process all falling within the scope of the invention as defined by the appended claims. The percentages of ingredients, the actual ingredients employed, the temperatures used, and the specified consistency of the slurry may all be somewhat changed to meet various conditions and still retain the fundamental principles of the invention in question.

The individual mechanical appliances referred to are of the ordinary type and are employed in the usual way, although their association together in the manner specified is new, thus rendering their illustration unnecessary so far as this application is concerned since it relates to the process rather than to the means for performing it, the latter being fully set forth and claimed in my co-pending application, Serial No. 360,959, filed February 24, 1920.

I claim:

1. The process of calcining phosphate-rock consisting in suddenly heating the material to be treated to the reaction temperature in from approximately from one to five seconds to prevent any substantial preliminary detrimental heat action on the material substantially as described.

2. The process of calcining phosphate-rock consisting in projecting the material to be treated into the heated reaction zone with sufficient speed to prevent any substantial preliminary sintering or fusing detrimental to the conversion of the phosphate into available form, substantially as described.

3. The process of calcining phosphate-rock consisting in suddenly heating a stream of the material to be treated progressively lengthwise to the reaction temperature in from approximately one to five seconds to prevent any substantial preliminary detrimental heat action thereon, substantially as described.

4. The process of calcining phosphate-rock consisting in suddenly heating a slurry stream of the material to be treated progressively lengthwise to the reaction temperature in from approximately one to five seconds to prevent any substantial preliminary detrimental heat action thereon, substantially as described.

5. The process of calcining phosphate-rock consisting in suddenly heating a slurry of the material to be treated of a consistency of approximately 45 to 55 degrees Baumé to a temperature of about 1100 to 1400 degrees centigrade with sufficient rapidity to prevent any substantial preliminary detrimental heat action on the material, substantially as described.

6. The process of calcining phosphate-rock consisting in playing a slurry stream of the material to be treated under pressure into a heated reaction zone maintained at an adequate temperature to heat the material with sufficient rapidity to prevent any substantial preliminary detrimental action on the material, substantially as described.

7. The process of calcining phosphate-rock consisting in playing a relatively-smooth substantially - undivided slurry stream of the material to be treated under pressure into a heated reaction zone maintained at an adequate temperature to heat the material with sufficient rapidity to prevent any substantial preliminary detrimental heat action thereon, substantially as described.

8. The process of alcining phosphate-rock which consists in playing a relatively-smooth substantially - undivided slurry stream of the material to be treated into a heated reaction zone maintained at an adequate temperature to heat the material with sufficient rapidity to prevent any substantial preliminary detrimental heat action thereon, and changing the position of such stream in the reaction zone, substantially as described.

9. The process of calcining phosphate rock consisting in playing a relatively-smooth substantially - undivided slurry stream of the material to be treated of a consistency of about 45 to 55 degrees Baumé into a heated reaction zone maintained at a temperature of approximately 1100 to 1400 degrees centigrade, substantially as described.

10. The process of calcining phosphate rock consisting in playing a relatively-smooth substantially - undivided slurry stream of the material to be treated of a consistency of about 45 to 55 degrees Baumé into a heated reaction zone maintained at a temperature of approximately 1100 to 1400 degrees contigrade, and shifting the position of such stream in the reaction zone, substantially as described.

MARK SHOELD.